United States Patent [19]

Ikegami et al.

[11] Patent Number: 4,614,889
[45] Date of Patent: Sep. 30, 1986

[54] CHARGING DYNAMOELECTRIC MACHINE HAVING REDUCED NOISE OUTPUT

[75] Inventors: Takashi Ikegami; Masakazu Mori, both of Hyogo, Japan

[73] Assignee: Mitsubishi Denki Kabushiki Kaisha, Tokyo, Japan

[21] Appl. No.: 724,716

[22] Filed: Apr. 18, 1985

[30] Foreign Application Priority Data

Apr. 18, 1984 [JP] Japan .............................. 59-59057[U]

[51] Int. Cl.⁴ .......................... H02K 3/16; H02K 5/24
[52] U.S. Cl. ..................................... 310/263; 310/42; 310/51
[58] Field of Search ................ 310/42, 263, 264, 261, 310/156, 208, 157, 68, 168, 51

[56] References Cited

U.S. PATENT DOCUMENTS

| | | | |
|---|---|---|---|
| 3,230,404 | 1/1966 | Graham | 310/51 |
| 3,252,025 | 5/1966 | Brown et al. | 310/263 |
| 3,859,548 | 1/1975 | Morley et al. | 310/42 |
| 4,339,873 | 7/1982 | Kanamaru et al. | 310/42 |
| 4,374,337 | 2/1983 | Kohzai et al. | 310/51 |

FOREIGN PATENT DOCUMENTS

| | | | |
|---|---|---|---|
| 960033 | 4/1950 | France | 310/263 |
| 679750 | 9/1952 | United Kingdom | 310/263 |

*Primary Examiner*—Patrick R. Salce
*Assistant Examiner*—D. L. Rebsch
*Attorney, Agent, or Firm*—Sughrue, Mion, Zinn, Macpeak, and Seas

[57] ABSTRACT

A charging dynamoelectric machine having a reduced electromagnetically induced noise component, particularly, at the mechanical resonant frequency of the rotor thereof. In accordance with the invention, a pair of magnetic poles, each having a plurality of magnetic pole members extending from a respective yoke, are press fitted onto a rotary shaft with a field winding frame positioned between the yokes. A preload is applied between the yokes and the field winding frame on an exterior and peripheral portion thereof. The preload may be applied by tapering the base walls of the yoke or field winding frame, or by providing projections on the interior surfaces of the base portions of the yokes or on the outer opposed surfaces of the field winding frame.

5 Claims, 7 Drawing Figures

CHARGING DYNAMOELECTRIC MACHINE HAVING REDUCED NOISE OUTPUT

BACKGROUND OF THE INVENTION

The present invention relates to a rotor of a charging dynamoelectric machine which is driven by a vehicle or marine engine and which supplies electric power to a battery and electrically operated equipment.

A conventional charging dynamoelectric machine is shown in FIG. 1.

In FIG. 1, reference numeral 1 designates a rotor which is composed of a pair of jaw-type magnetic poles 2, a field winding frame 3 around which a field winding 4 is wound, a rotary shaft 5, and slip rings 6. The field winding frame 3 is held between the pair of magnetic poles 2 by press fitting the rotary shaft 5 thereinto. Stators 7 is disposed around the magnetic poles 2 with small clearances therebetween. Reference numeral 8 indicates a brush holder on which a voltage controller is mounted. Reference numeral 9 indicates a rectifier. A driven pulley 10 and fan 11 are integrally fixed to the rotary shaft 5 respectively. Reference numerals 12 and 13 indicate brackets, and numerals 14 and 15 indicate bearings for rotatably supporting the rotor 1.

FIG. 2 is a fragmentary enlarged view showing the magnetic poles 2 and the field winding frame 3 included in the rotor 1. In FIG. 2, a plurality of pole teeth 22 extend from the yokes 21 of the poles 2. Reference numeral 3a indicates exterior surfaces of the field winding frame 3. Interior surfaces of the base portions 21a of the yokes 21 and the exterior surfaces 3a of the field winding frame extend parallel to one another.

The operation of the conventional charging dynamoelectric machine will now be explained. A field current is supplied via the brush holders 8 and slip rings 6 to the field winding 4. At the same time, the pulley 10 is driven by a belt. Accordingly, the stators 7 generate an alternating current. This alternating current is converted by the rectifier 9 to a direct current, which forms the output of the generator.

During the period of time when the dynamoelectric machine is actuated, a magnetic attractive force is applied to the magnetic poles 2 due to the magnetic flux in the gaps between the magnetic poles 2 and the stators 7. This magnetic flux changes continuously with time so that the magnetic attractive force acts as oscillating force on the magnetic poles 2 in a manner as shown by arrows in FIG. 2. This oscillation produces so-called "electromagnetic sound", constituting a detrimental property of the machine.

SUMMARY OF THE INVENTION

It is an object of the invention to provide a rotor for a charging dynamoelectric machine which is very simple in structure and which suppresses the generation of electromagnetic sound.

In accordance with the above and other objects, the invention provides a charging dynamoelectric machine having a rotor wherein a preload is applied betwen jaw-type magnetic poles and a field winding frame, and wherein the field winding frame serves as a damper of oscillations.

DESCRIPTION OF THE PREFERRED EMBODIMENTS

Preferred embodiments of the present invention are shown in FIGS. 3, 4, 5, and 6.

Figure 3:
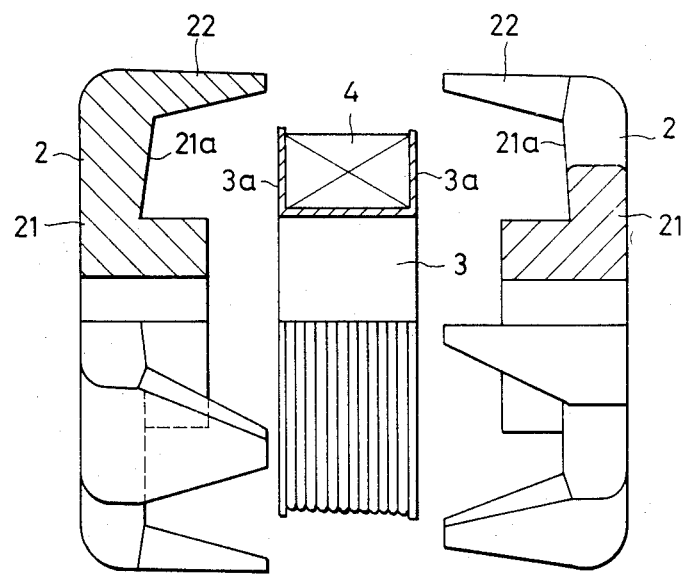
FIG. 3 is a fragmentary sectional side view showing a first rotor embodying the present invention.

Referring first to FIG. 3 illustrating a first embodiment of a rotor of the invention, the wall thickness of the base portion 21a of each of yokes 21 of the two magnetic poles gradually increases towards the periphery thereof. This serves to exert a preload between the exterior surfaces 3a of the field winding frame 3 and interior surfaces 21a of the yokes 21. More specifically, the distance between the thinner portions of the walls of the base portions 21a of the yokes 21, namely, the distance between the inner peripheries of the inner surfaces of the two base portions 21a, is set so as to correspond to the width of the field winding frame 3. Thus, the distance between the thicker portions of the walls of the base portions 21a of the two yokes 21 is less than the width of the field winding frame. For this reason, a preload is applied to the periphery of the exterior surfaces 3a of the field winding frame and of the interior surfaces 21a of the yokes when the aforementioned parts are assembled.

Figure 4:
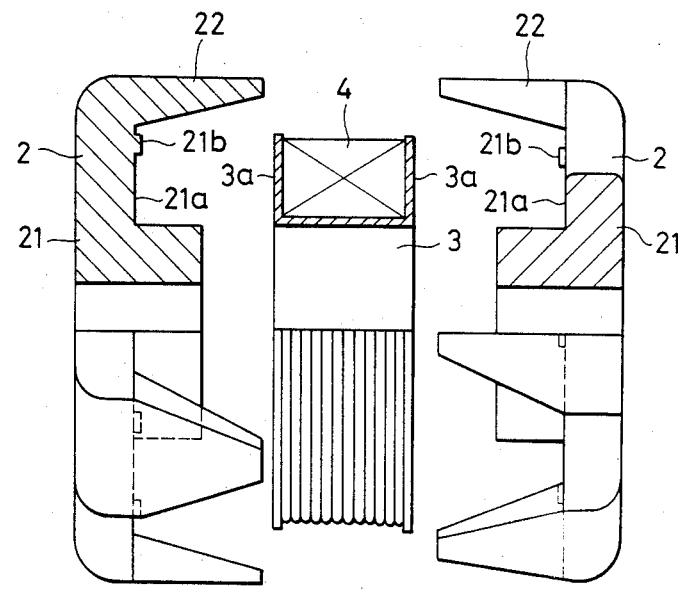
FIG. 4 is a fragmentary sectional side view illustrating a rotor of a second embodiment of the invention.

In another embodiment shown in FIG. 4, the inner surfaces of the base portions 21a of the yokes 21 are provided with projections 21b to thus apply a preload.

Figure 5:
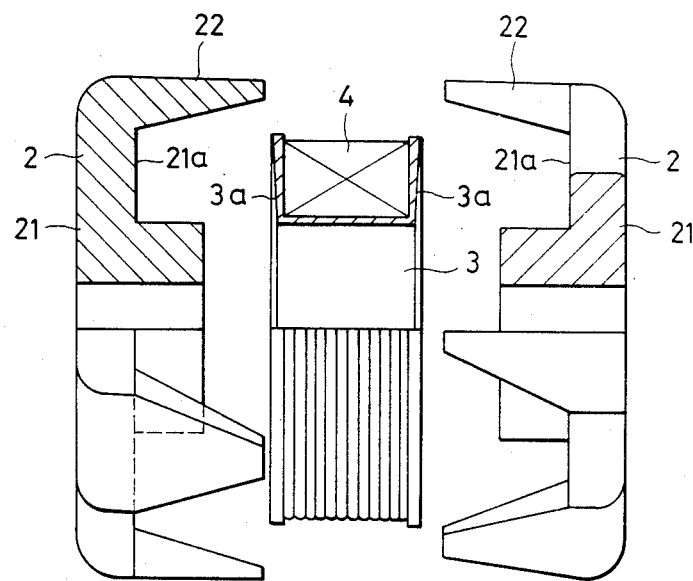
FIG. 5 is a fragmentary sectional side view showing a rotor of a third embodiment of the invention.

In a further embodiment illustrated in FIG. 5, the exterior surfaces 3a of the field winding frame gradually increase in thickness toward the peripheries thereof to exert a preload.

Figure 6:
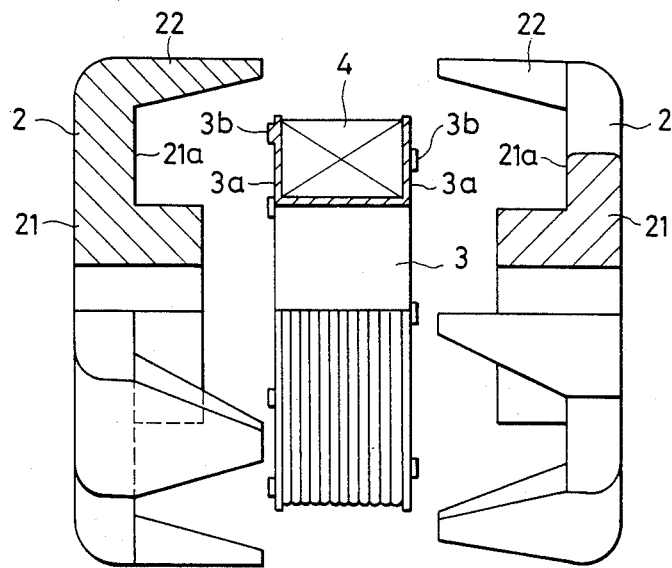
FIG. 6 is a fragmentary sectional side view illustrating a rotor of a fourth embodiment of the invention.

In a still further embodiment shown in FIG. 6, the field winding frame is provided adjacent the peripheries of the exterior surfaces 3a thereof with projections 3b to apply a preload.

Figure 1:
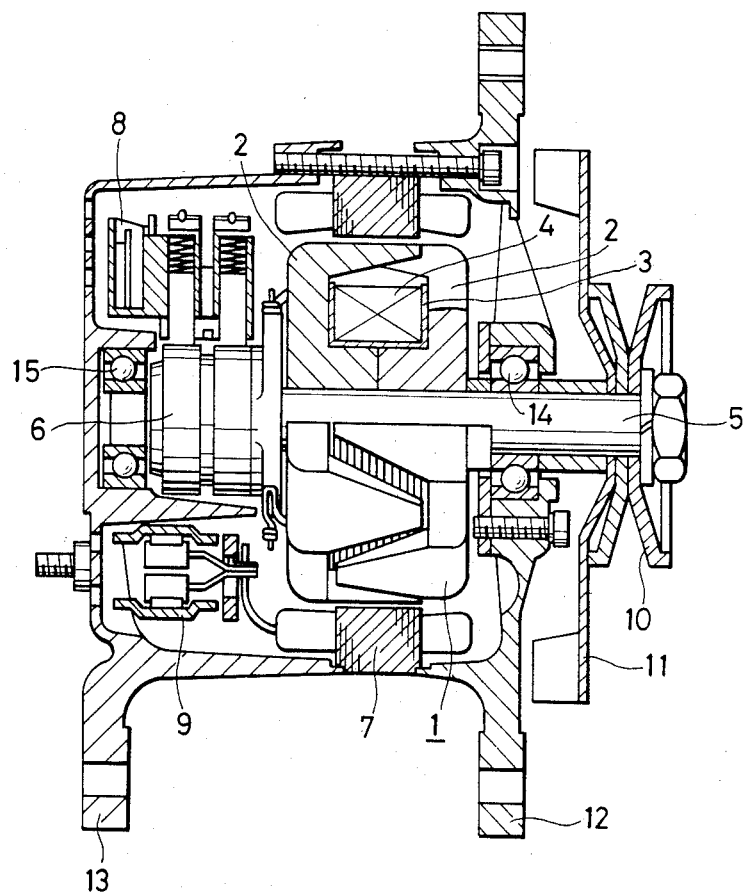
FIG. 1 is a side view in section of a conventional charging dynamoelectric machine.
Figure 2:
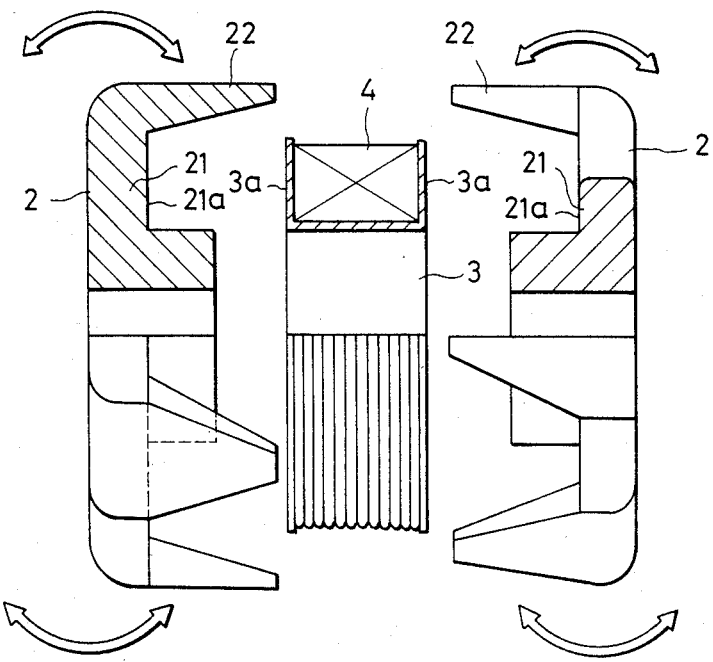
FIG. 2 is a fragmentary side view, partly in section, showing a conventional rotor.

As set forth hereinafter, a preload may be applied to the periphery of the interior surfaces 21a of the yokes of the magnetic poles and of the exteriors 3a of the field winding frame so that the fixed winding frame 3 serves to damp oscillations of the magnetic poles 2, as described with reference to FIG. 2.

In the conventional rotor, oscillation of the magnetic poles 2 has involved a resonant phenomenon, whereby the oscillation frequency corresponds to a natural resonant frequency. However, with the rotor according to the invention, the field winding frame 3 acts as a damper to eliminate such resonant phenomenon.

Figure 7:
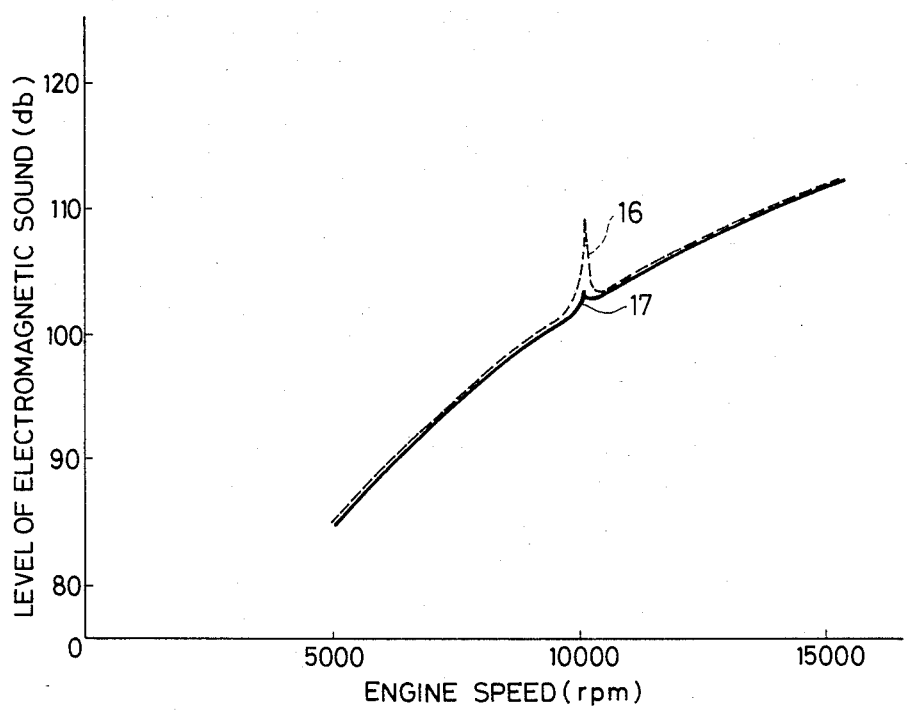
FIG. 7 is a graph illustrating the relationship between the level of electromagnetic sound and engine speed of charging dynamoelectric machines according to the prior art and the present invention.

FIG. 7 is a graph showing electromagnetic sound output levels of charging dynamoelectric machines of the prior art and the invention. In FIG. 7, a dotted line 16 indicates the electromagnetic sound output level of a conventional charging dynamoelectric machine and a solid line 17 indicates an electromagnetic sound output level of a charging dynamoelectric machine constructed according to the invention. The conventional machine produces a peak sound level about 6 dB (at 10,000 rpm where resonance occurs) above that of the machine of the invention.

According to the present invention, as described above, a preload is applied between the magnetic poles and the field winding frame so that the latter acts as a damper on oscillations. Accordingly, the level of electromagnetic sound is significantly reduced using a very simple arrangement.

We claim:

1. A charging dynamoelectric machine having a rotor comprising:
    a pair of magnetic poles each including a yoke press fitted onto a rotary shaft and a plurality of magnetic pole claws extending from each said yoke;
    a field winding frame positioned between said pair of said yokes and held thereby; and
    means for applying a preload between respective inner surfaces of said yokes and an outer radial portion of said field winding frame greater than a preload between said respective inner surface and an inner radial portion of said field winding frame.

2. The charging dynamoelectric machine of claim 1, wherein said preload applying means comprises base-end portions of each said yoke having a thickness which increases in a radial direction thereof.

3. The charging dynamoelectric machine of claim 1, wherein said preload applying means comprises a plurality of projections provided on interior surfaces of base portions of each said yoke, said projections contacting said outer radial portions of said field winding frame.

4. The charging dynamoelectric machine of claim 1, wherein said preload applying means comprises outer opposed walls of said field winding frame, in contact with a respective interior surface of each said yoke having distances between outer surfaces thereof which increase in a radial direction of said field winding frame.

5. The charging dynamoelectric machine of claim 1, wherein said preload applying means comprises a plurality of projections provided on exterior surfaces of said field magnetic winding frame in contact with respective interior surface of each said yoke.

* * * * *